United States Patent [19]
Dasso

[11] Patent Number: 5,650,815
[45] Date of Patent: *Jul. 22, 1997

[54] METHOD AND APPARATUS FOR GENERATING A THREE-DIMENSIONAL EFFECT FOR TWO DIMENSIONAL IMAGES

[76] Inventor: John M. Dasso, 2933 SE. Taylor, Portland, Oreg. 97214

[*] Notice: The term of this patent shall not extend beyond the expiration date of Pat. No. 5,434,613.

[21] Appl. No.: 677,946

[22] Filed: Jul. 10, 1996

Related U.S. Application Data

[63] Continuation of Ser. No. 152,200, Nov. 12, 1993, abandoned, which is a continuation-in-part of Ser. No. 990,394, Dec. 10, 1992, Pat. No. 5,434,613.

[51] Int. Cl.$^6$ .......................... H04N 13/00; H04N 15/00
[52] U.S. Cl. ........................ 348/42; 348/44; 348/51
[58] Field of Search .................. 348/42, 44, 51, 348/54, 49, 55; 352/86, 57; 359/458, 466; H04N 13/00, 15/00

[56] References Cited

U.S. PATENT DOCUMENTS

2,865,988  12/1958  Cafarelli, Jr. ........................ 348/42
4,705,371  11/1987  Beard ................................. 352/86
4,709,263  11/1987  Brumage ............................. 348/42
4,893,898   1/1990  Beard ................................. 348/42
5,243,460   9/1993  Kornberg ............................ 348/42

*Primary Examiner*—Howard W. Britton
*Assistant Examiner*—Vu Le
*Attorney, Agent, or Firm*—Robert L. Harrington

[57] ABSTRACT

A method and apparatus for creating an illusion of depth when viewing moving pictures projected on a plane surface. Glasses to worn by a viewer when viewing the moving pictures have the property of altering or distorting the real image projected. The disparity between the apparent images viewed by the two eyes creates an image disparity that is interpreted as a perception of depth. The glasses incorporate a lens for the dominant eye and a lens for the docile eye of the viewer with lens for the dominant eye having different attributes than the attributes for the docile eye. The lens for dominant eye narrows the image along the visual plane and the lens for the docile eye broadens the image along the visual plane. The lens for each eye is appropriately tinted to enhance the perception of depth. The glasses are reversible to enable placing the desired lens in front of the dominant and thus the docile eye.

13 Claims, 5 Drawing Sheets

METHOD AND APPARATUS FOR GENERATING A THREE-DIMENSIONAL EFFECT FOR TWO DIMENSIONAL IMAGES

This is a continuation of application Ser. No. 08/152,200 filed on Nov. 12, 1993 now abandoned.

Which application is a continuation-in-part of application Ser. No. 990,394 filed Dec. 10, 1992, now U.S. Pat No. 5,434,613 titled METHOD AND APPARATUS FOR GENERATING A THREE-DIMENSIONAL EFFECT FOR TWO-DIMENSIONAL IMAGES.

FIELD OF THE INVENTION

This invention relates to the provision of a three-dimensional effect on motion pictures projected on two-dimensional surfaces which does not rely on special filming and projection techniques.

BACKGROUND OF THE INVENTION

Motion pictures as used herein includes all forms of image illustration on two-dimensional surfaces where the images appear to be in motion. Television and movies are two forms of motion pictures. (But not necessarily the only forms.) A two-dimensional surface here means a surface that displays an image in two-dimensional form. Thus, the "surface" itself may be curved or flat.

The concept of generating a perception of depth for images portrayed on a two-dimensional surface (having height and width only relative to the viewer) has existed for many years Artists of course learned early on that a perception of depth can be achieved by varying size relationships, by strategic shading of objects, and even by changes in crispness of the images.

The concept of generating perceived depth dimension was carried to a new level following the advent of motion pictures. It was appreciated that much of what a viewer sees as depth is due to slight differences seen by the two eyes of a viewer. That is the two eyes being spaced apart see the image from different angles. The differences vary depending on a number of factors and the mind "learns" to recognize these differences as indicating depth. This "new" concept of generating depth relies on artificially imitating certain of these differences. Basically this was achieved by overlaying two near identical but different images on a surface, (e.g., taken by two motion picture cameras spaced apart a distance equal to the spacing of a viewer's eyes and projecting the images simultaneously onto a screen). The projections were also differentiated, e.g., by color or polarization and the viewer was required to view the projected images through special lenses that filtered out one of the projected images to one eye, and the other of the projected images to the other eye. The viewer's mind "sees" but one image and interprets the differences as depth and thus "sees" the third dimension even though it does not exist.

The above concept of three-dimensional viewing was introduced into the motion picture industry some 40 or more years ago. (See introduction to 3-D, Three-Dimensional Photography In Motion Pictures, by H. Dewhurst, the Macmillon Company, New York, 1954, incorporated herein by reference.)

The manner in which a "filmed" motion picture is produced provided yet a further alternative. The typical film projection is a series of still pictures sequentially taken of a moving object. The pictures being rapidly displayed on a screen, the viewer's mind perceives the different positions of objects in the pictures to be movement. Rather than employ two separate projectors, a somewhat three-dimensional effect is achieved by simply alternating the pictures within the sequence. Two similar but different motion picture films are produced and the frames of the two films are interspersed. One of the lenses of the glasses worn by a viewer is darkened and the other is clear. As best understood, the viewer's mind more slowly reacts to the darkened images and the film speed i. timed so that the darkened images only are seen by that one eye.

In every case heretofore known, there are two essentials for providing the artificial three-dimensional effect (other than the artist's techniques of shading, etc.). There must be dual images filmed and projected onto the screen and there must be different right and left lenses covering the viewer's eyes that discriminately filter out one or the other of the images projected. Thus, unless the subject is filmed and projected using one of the methods of dual projection of an image onto a common screen to provide discriminate images for viewing by the viewer's right and left eyes, 3-D glasses have not heretofore provided the three-dimensional effect that is desired. There must be different right and left lenses that discriminately filter out the images, and there must be dual images projected onto the screen that are discriminately viewed by the right and left eyes of the viewer.

The present invention is directed to a concept that provides the desired perceived depth dimension using specialized 3-D glasses but which can provide the perceived depth dimension using standard filming, i.e., a single moving picture projected onto a two-dimensional screen.

BRIEF DESCRIPTION OF THE INVENTION

The present invention utilizes the movement of images on a two-dimensional display surface as the vehicle for developing the depth dimension which is based on the following theory.

A viewer's left and right eyes will see an image along two slightly different view lines because the eyes are about 2 ½ inches apart. A three-dimensional image, i.e., one that has depth, will be seen from slightly different angles by the two eyes and that angle produces a slightly different image of the same object. This difference is, of course, only one, but an important one of the indicators that is perceived by the mind of the viewer as depth dimension.

Obviously, a single object projected on a two-dimensional screen will be viewed as the same identical image to the two eyes. To create the perception of depth, the present invention provides for a lens to be provided in front of one of the viewer's eyes that slows the light transmission and thus delays the impingement of a viewed image onto that one eye relative to impingement of the image onto the other eye. Thus, the image seen by that one eye is a small fraction of a second later than when that same image is seen by the other eye. When images are non-moving, there is no difference detected by the viewer's mind. However, images that move are seen in different positions by the two eyes. Technically the differences are not the same as when seen from two slightly different angles. However, to the viewer's brain the image is similar but different and the difference is perceived as depth dimension.

As applicable for viewing a single motion picture projection, other three-dimensional enhancement techniques are beneficial. Of particular benefit is convergence. It is known that an image projected on a screen can be made to appear in front of the plane of the screen by forcing the eyes to converge so the focal point is in front of the screen, i.e., through proper grinding of the lenses which makes images on the screen appear closer to the viewer. It has been discovered that coupling the forced convergence with the lenses described above (having one lens that slows down light transmission) will enhance the three-dimensional effect of those lenses. It is believed that providing the image differentiation plus parallax and perspective which properties are inherent in the images as filmed, when coupled with convergence provide a apparent realistic (but simulated) depth dimension to the viewer's mind.

With reference now to the slow-down-lens concept, the simple provision of a lens in front of one of the eyes, which lens slows light transmission, and without a lens in front of the other eye, is sufficient to provide the desired image differentiation. However, that basic concept can be improved upon. Known lenses all produce some refraction of the transmitted light which to some extent inherently shifts the line of sight of that eye only and thus different than the line of sight for the other eye. The viewer's brain is thus forced to deal with an unfamiliar factor (different angles of sight as between the two eyes and a lack of convergence) and this can cause discomfort. The discomfort can be alleviated by the provision of a second lens over the other eye that provides the convergence angle but without slowing light transmission, or at least to a lesser degree than that of the first eye (it being recognized that any lens will likely produce some slowing of light transmission).

A further improvement is achieved by insuring that the eye that receives the slowed down image is the dominant eye. A viewer's brain when subjected to two substantially different images from the two eyes will ignore the image of one eye in favor of the other. The brain is consistent in favoring that other eye which is referred to as the dominant eye. By experimentation it has been found that the slowed image viewed by the dominant eye will provide better three-dimensional effect than in the reverse situation.

It has also been found that optimally, the "slow down" lens is treated with a pigment that darkens the image for that eye. It has long been known that the mind more slowly reacts to darker images and thus the slow down effect of the lens can be enhanced through shading.

As previously explained a viewer's brain is taught to recognize image "differences" as being indicative of depth. There are many such differences. Most cannot be duplicated on a two-dimensional display screen but a significant number can be imitated. However, without some form of image differentiation, the depth dimensional enhancement techniques have not been acceptable for commercial application. The present invention obviates the need for projecting overlapping or sequential image and provides an enhanced depth dimension for two-dimensional motion picture display that is far less complicated or expensive to produce.

The reader will appreciate that whereas motion on a display screen is important to achieving the desired image differentiation, that motion can be produced by the motion picture camera being moved past a stationary object. Thus, a picture of a motionless tree taken by a camera moving past the tree (e.g., from a car) will be moving across the screen when viewed by a viewer. An object moves when its position changes from one frame of the film to the next. It is also to be understood that a lens is any form of light transmitting media that can be discriminately placed over a viewer's eye to slow the transmission of light. It might even be an apparatus whereby light projected toward a viewer's eye is intercepted, e.g., by a mirror, and through an extended path of reflection from a plurality of mirrors, delays impingement of the image onto that eye.

While the slowing of the transmission of light to one of the eyes, preferably the dominant eye, satisfactorily produces a perception of depth, the perception of depth may be enhanced by providing the lenses for the eyes with differential power in addition to the arrangement for slowing the light transmission to tie dominant eye. The lens provided for the dominant eye is provided with negative power that narrows the real image and in effect makes the image appear farther away. The lens for the docile eye is provided with positive power that broadens the real image and in effect makes the image appear closer. The disparity between the apparent images as seen by the dominant and docile eye is interpreted by the brain through visual experience as depth.

It is recognized that the dominant eye may be different for different individuals. That is one individual may have a dominant right eye and another individual may have a dominant left eye. To accommodate this variance, glasses are provided that are reversible. Thus the preferred lens for the dominant eye may be placed in front of the dominant eye regardless of whether the dominant eye be the left eye or the right eye. Accordingly the preferred lens for the docile eye is placed in front of the docile eye.

The invention will become further understood and appreciated by reference to the following detailed description and drawings wherein.

DESCRIPTION OF THE PREFERRED EMBODIMENT

Figure 1:
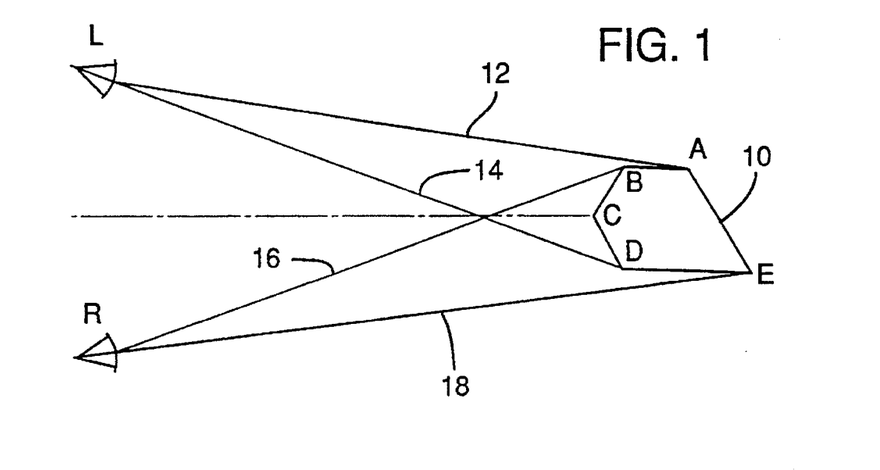
FIG. 1 is a schematic illustration of two eyes of an individual viewing an object.

The present invention is a method and apparatus for generating an illusion of depth for moving pictures projected on a plane surface. It is believed that one of the many factors involved in depth perception is the differences in images as seen by the left and right eye of the individual. FIG. 1 illustrates schematically one of the differences in the two images seen by the left and right eyes of an individual when looking at an actual, three-dimensional object centrally positioned at a distance from the eyes. The left and right eyes (designated as L and R) of an individual are looking at an object 10. A ray 12 extended from A and a ray 14 extended from D will impinge the left eye (retina) L. Rays 12 and 14 designate the extremity of the object 10 which the left eye will see. Similarly, a ray 16 extended from B and a ray 18 extended from E designate the extremity of the object which the right eye R will see. The image impinged on the left and right eyes are thus different. The left eye will see sides AB, BC and CD of the object 10 and the right eye will see sides BC, CD and DE. The image difference as between the two eyes is one of the many factors or attributes utilized by the brain in the perception of depth.

Figure 2:
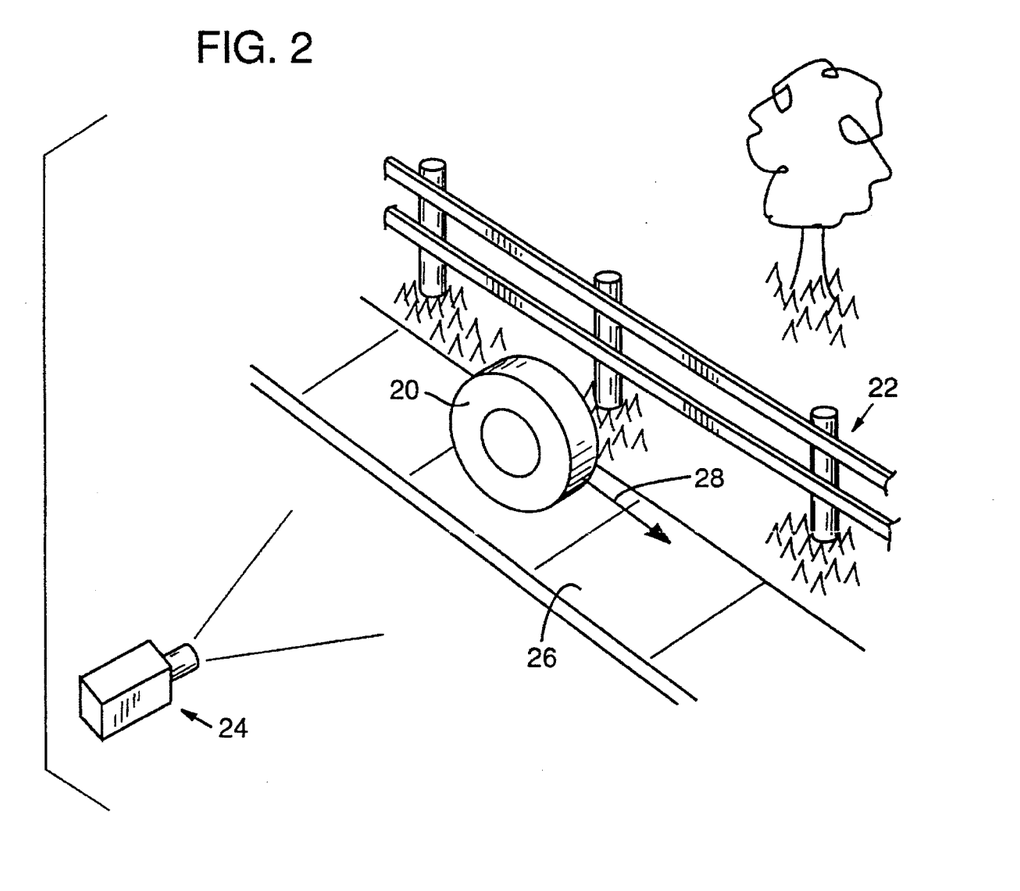
FIG. 2 is a schematic illustration of a motion picture camera filming a scene.

Consider now that a moving picture is taken of a wheel 20 rolling past a stationary fence 22 as depicted in FIG. 2. A camera 24 takes pictures of the wheel 20 as it rolls along on the sidewalk 26 traveling in the direction indicated by arrow 28. When the recorded moving pictures are projected on a screen 29 (see FIG. 3), the images of the scene are all displayed on the screen 29. However there is not a true depth perception since all of the images lie on the same plane. That is, the images are on the planar surface of the screen 29. Stated another way, the images are proper in perspective but lack in the perception of depth. That is the wheel does not "stand out" in front of the fence nor does the fence "stand out" in front of the tree and so on. The images are all at the same distance from the viewers eyes since all the images lie on the same plane and therefore there is not a discernable difference between the images impinged on the left eye versus the right eye for the objects in view. Simply put, both eyes see the same image.

Figure 4:
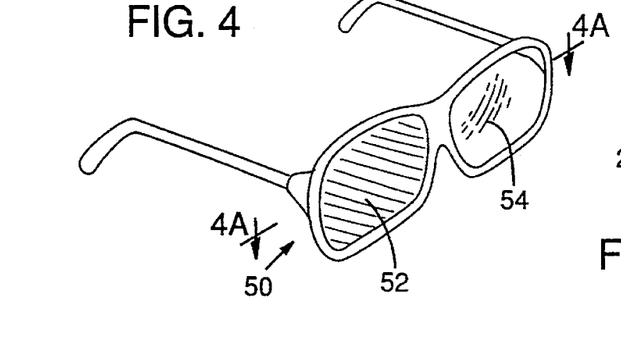
FIG. 4 is a perspective view of a pair of glasses of the present invention for viewing the moving pictures projected on the screen of FIG. 3.

Refer now to FIG. 4 of the drawings. A pair of glasses 50 are illustrated which are to be worn by an individual when viewing a moving picture projected on a planar surface. The glasses 50 have one lens 52 that has special attributes as distinguished from lens 54. The lens 52 has the property of slowing the transmission of light, that is, it decreases the velocity of light transmitted through the lens.

Figure 3:
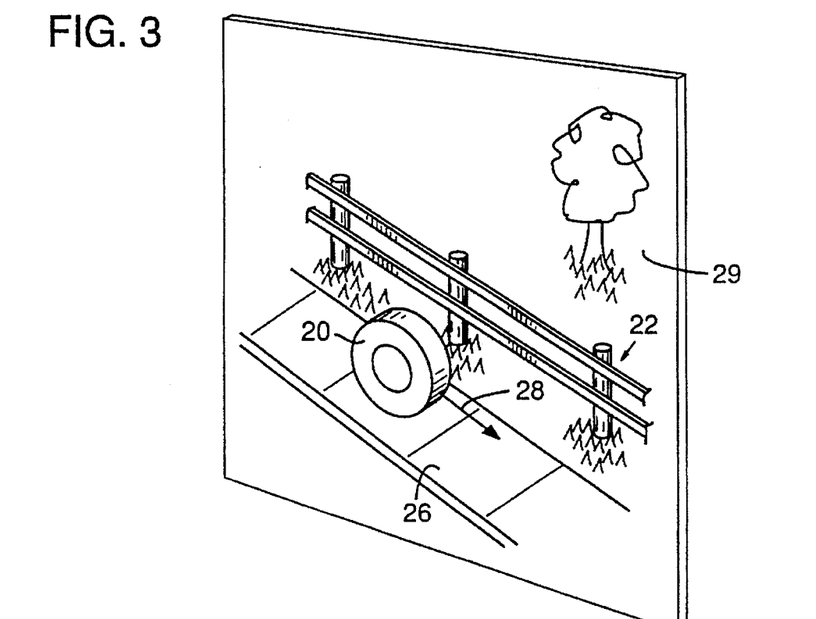
FIG. 3 illustrates the filmed scene of FIG. 2 projected onto a screen.
Figure 4A:
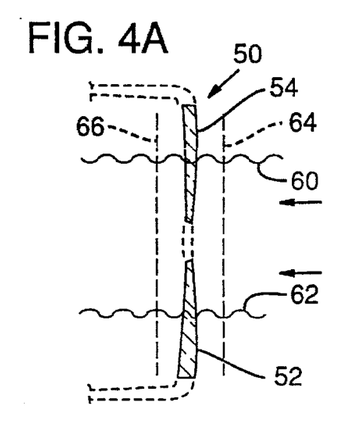
FIG. 4A is a view of the glasses of FIG. 4 as viewed on view lines 4A—4A and illustrating the different properties of light transmission for the two lenses.

Consider now an individual wearing the glasses 50 and viewing the same moving pictures projected on the screen 29 of FIG. 3. As the images of the moving pictures are projected on the screen, the images will be impinged on the eyes (retina) of the individual. The image transmitted through the lens 52 will however impinge upon the eye looking through the lens 52 later than the image impinges the other eye. This time differential, even though it is minuscule, will in effect simulate a dis-similarity of images as seen by the left and right eyes. Such a differential is more accurately referred to as a phase shift in the light waves as it traverses the lens and that term will be alternately used in the description that follows. This phase shift is illustrated in FIG. 4A wherein light waves 60 and 62 are illustrated as having matching wave patterns prior to entering lenses 54 and 52, respectively (see plane 64). The wave 62 is compressed in lens 52 to a far greater extent and upon emerging (at plane 66) the light waves are out of phase. The illustration is schematic and the description is brief as those skilled in the art are well versed on the basic concept of phase shift effect on light waves.

Figure 5:
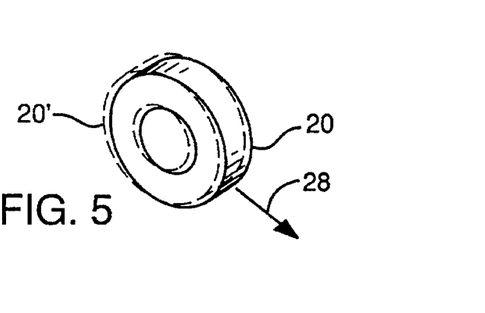
FIG. 5 is a view of a wheel of the scene of FIG. 2 depicting image difference when viewed through the glasses of FIG. 4.

As seen in FIG. 5 which shows only the wheel 20 in motion as indicated by arrow 28, the eye looking through the lens 52 will perceive to see the image 20' and the other eye will see the image 20. It will be appreciated that the image difference or the positional placement of the images 20 and 20' has been exaggerated for explanatory purposes. In actuality, the image of 20' does not "appear" on the screen, but is perceived to be thus by the eye looking through the lens 52. The perceived image dis-similarity will provide stimulus to the brain to be interpreted as depth. Thus the moving wheel 20 will appear to "stand out" from the fence 22.

It will be appreciated that this phenomenon of depth will occur only for objects in motion. Thus the fence 22 will not have the perceived depth since a ray from a post for example, will be coincident for either eye even though the light has been phase shifted through the lens 52. While only one moving object has been portrayed for purposes of example, most moving pictures have much more moving action. Typically, birds are flying, people are walking, automobiles are moving and even the limbs of the trees may be in motion due to the wind and so forth. Also, recall that stationary objects will move across the screen if the picture was filmed with the camera moving, e.g., a scene filmed from a moving car.

Refer once again to FIG. 4 of the drawings. It is known that one eye of an individual is dominant. It has been found by experiment that the perception of depth achieved by wearing the glasses 50 is enhanced when the lens 52 is placed in front of the dominant eye. The lens material of the lens 52 is preferably a 1.61 high index refraction plastic. It has also been determined that the perceived depth perception is greater when the lens 52 is treated with a pigment. The lens 52 is therefore charcoal tinted so that it has a luminous transmittance of 8%. The lens 52 is a ¾ prism diopter with the axis of the prism 180 degrees base out and is of neutral power (see FIG. 4A).

The eyes of an individual converge or toe-in to align their optical axis on a point of an object which an individual intently gazes at. The refraction properties of the lens 52 will affect the toe-in and for this reason a lens 54 is also provided in the glasses 50 for the docile eye so that a wearer will not experience any discomfort when wearing the glasses 50 to view a projection of moving pictures. The material of the lens 54 is preferably 1.485 CR-39; index refraction plastic. The lens 54 is ¾ prism diopter with the axis of prism 180 degrees base out and is of neutral power. Lens 54 is clear without any tint.

Figure 4B:
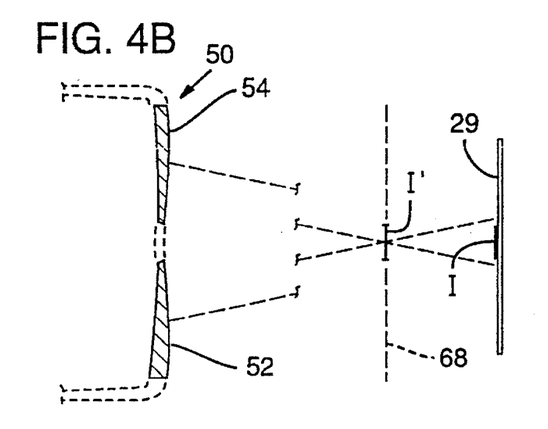
FIG. 4B is a view similar to FIG. 4A but illustrating the property of light convergence.

Convergence has a further benefit as previously explained, i.e., it enhances the perception of depth dimension. This is illustrated in FIG. 4B. Lenses 52 and 54 are ground to have a point of convergence that is forward of screen 29, i.e., at plane 68. Thus, an image I projected on screen 29 will appear to the viewer at plane 68. Convergence, as well as parallax, and perspective are properties known to those skilled in the art and further explanation of these phenomena is not necessary.

Figure 6:
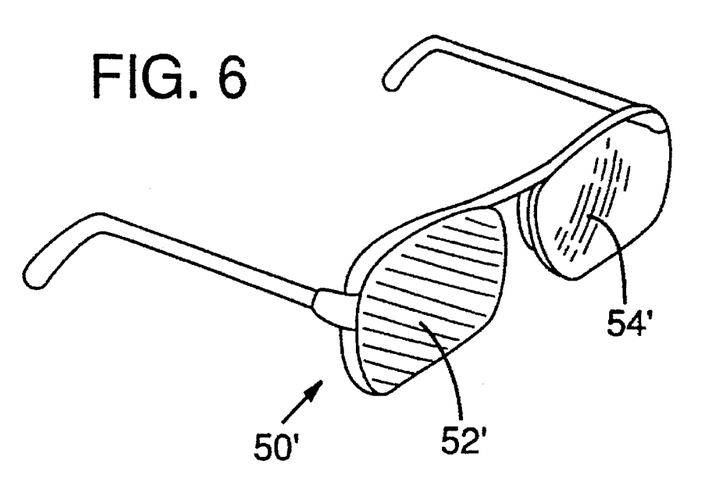
FIG. 6 is a view of another embodiment of the glasses of the present invention.

The projection of color animation features requires a somewhat different lens arrangement than that of projections of moving pictures. Referring to FIG. 6 which illustrates glasses 50', the lens 52' for the dominant eye is preferably 1.61 high index refraction plastic, ¾ prism diopter with the axis of prism 180 degrees base out. Lens 52' is of neutral power and is tinted a medium blue-green with a transmittance of 8%. Lens 54' for the docile eye is ¾ prism diopter with the axis of prism 180 degrees base out. Lens 54' for the docile eye is 1.485 CR-39 index of refraction plastic of neutral power and is tinted a medium red with a transmittance of 4%.

Figure 7:
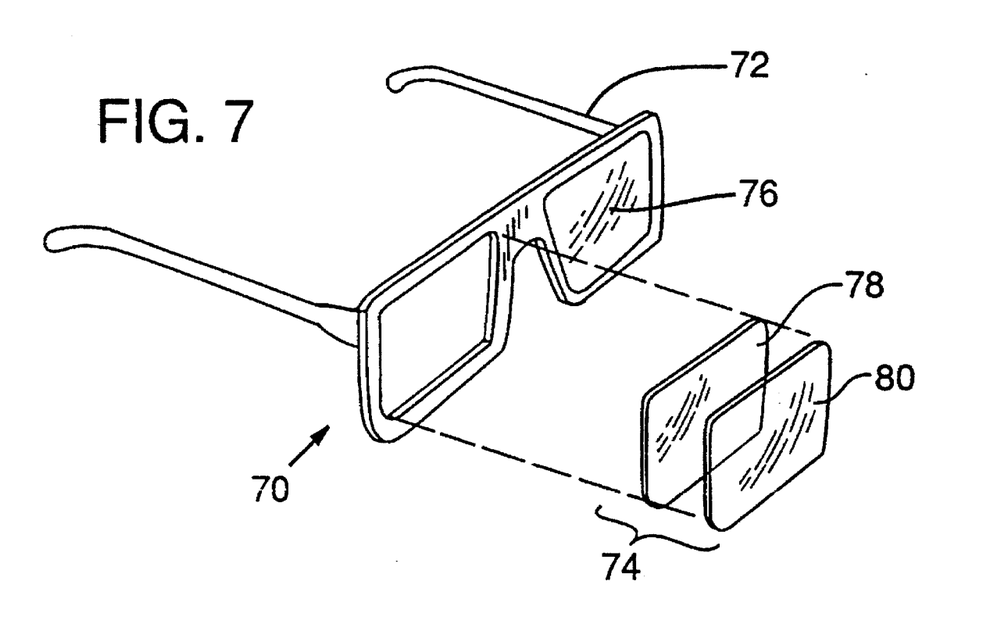
FIG. 7 is a view of another embodiment of the glasses of the present invention.

Glasses are frequently provided as throw-away items having frames of card stock and the lens of film material. Referring to FIG. 7, a pair of glasses 70 is illustrated having a frame 72 produced from card stock and lenses 74 and 76 of film material. Lens 74, for the dominant eye is fabricated from two separate film pieces laid one on the top of the other. The first film 78 has a medium blue green tint with a transmittance of 15%. The second film 80 has a coburn-blue tint with a transmittance of 14%. It will be appreciated that the dominant lens 74 may be of one piece of film that is equal in color and transmittance to the two films 78 and 80, however it has been found that the perception of depth is greater when the lens 74 is fabricated using the two separate films. The lens 76 for the docile eye is made from one piece of film with a medium red color tint with a transmittance of 4%.

It will be appreciated that the lens for the dominant eye has been illustrated in the glasses of the various figures for the right eye. For individuals with dominant left eyes, the lens would be changed accordingly, as for example lens 52 of glasses 50 would be placed in the glasses in front of the left eye.

Figure 8:
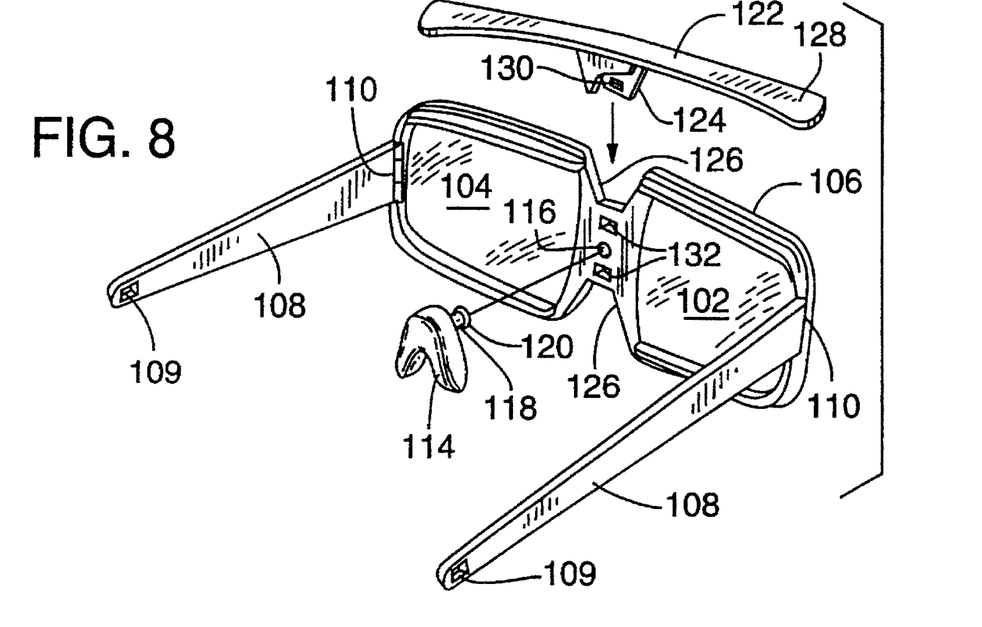
FIG. 8 is a perspective view of a pair of reversible glasses of the present invention.
Figure 9:
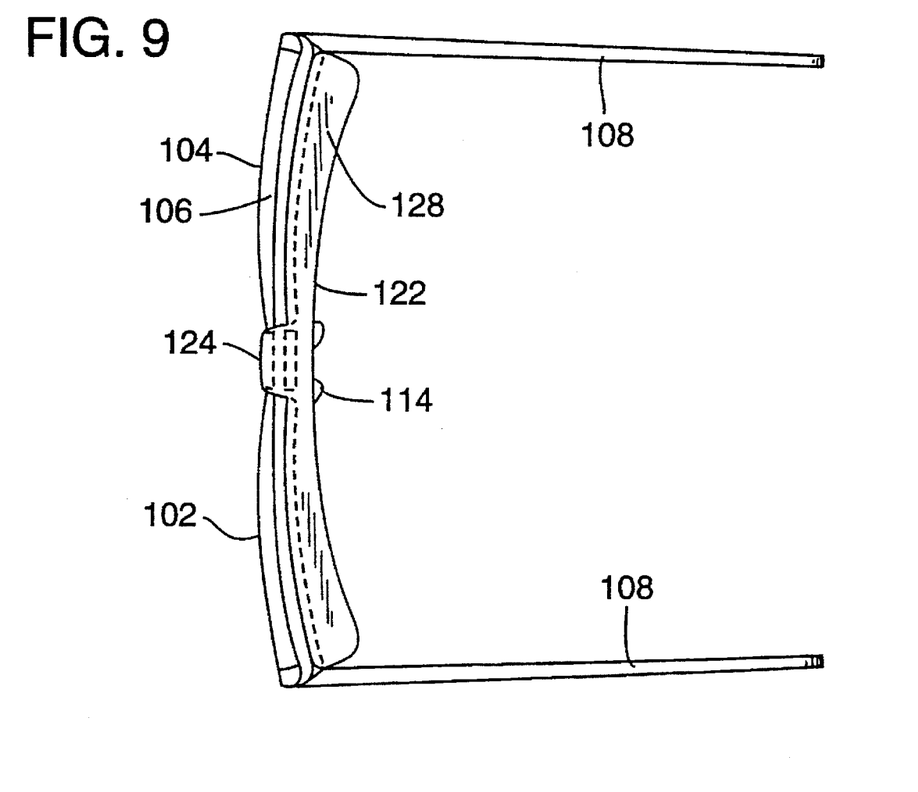
FIG. 9 is a top view of the glasses of FIG. 8.

Rather than having to provide separate glasses arranged for dominant left eyes or dominant right eyes, glasses 100 are provided that are reversible as illustrated in FIGS. 8 and 9. The glasses 100 have a lens 102 that is to, placed in front of the dominant eye of an individual and a lens 104 that is to be placed in front of the docile eye of the individual. The glasses 100 are reversible, that is the glasses 100 may be flipped over and worn by an individual so that the lens 102 is in front of the dominant eye, whether the dominant eye be the left eye or the right eye. The glasses 100 have a symmetrical frame 106 in which the lens 102 and the lens 104 are mounted. Symmetrical bows 108 are hinged to each side of the frame 106 on hinges 110 and extend from the frame 106 such that the glasses 100 are symmetrical. The bows 108 have holes 109 formed in their extended end for attaching a conventional neck band (not shown).

To facilitate fitting the glasses 100 on the individual in each of its reversible positions, the glasses 100 have a reversible nose bridge 114 that is removably and rotatably mounted to the frame 106 between the lens 102 and lens 104 in an aperture 116. The nose bridge 114 is preferably of a soft resilient material. The nose bridge 114 has a protruding shaft 118 that will rotatably fit in the aperture 116 of the frame 106. The shaft has an enlarged end 120 that serves as a retention device to maintain the shaft 118 in the aperture 116. The shaft 118, being resilient is simply forced into the aperture 116 with the enlarged end 120 passing through the aperture 116 to engage the edges of the aperture. In addition to being removably mounted, the bridge 114 is rotatable on the shaft 118 facilitating positioning the nose bridge 114 in the proper position depending on which way the glasses are worn. The nose bridge 114 is removed by pulling the bridge 114 away from the frames 106. The shaft 118 (and the enlarged end 120) being resilient will yield to allow the shaft 118 to be removed from the aperture 116.

Figure 10:
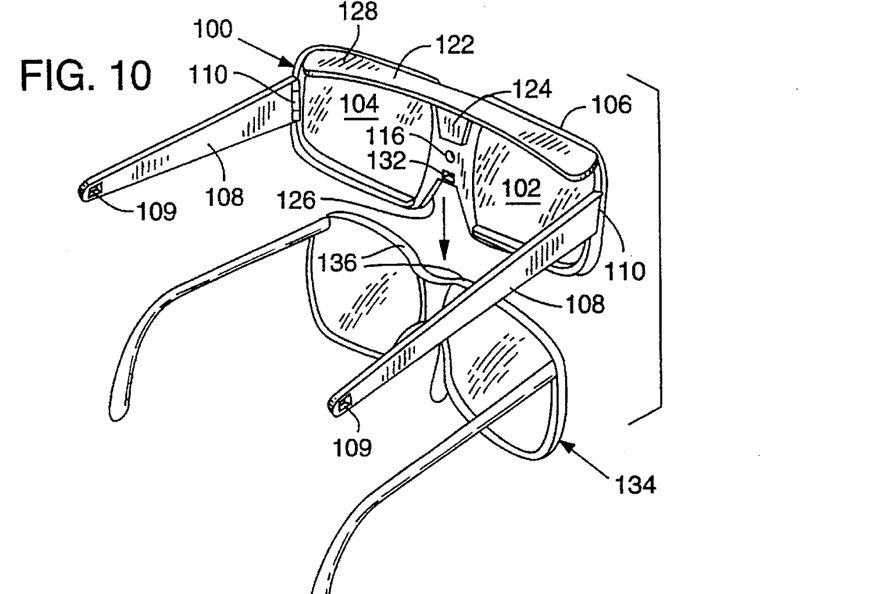
FIG. 10 is a view illustrating the use of the glasses of FIG. 8 with another pair of glasses, i.e., glasses used by a viewer for normal vision.

Often individuals have other glasses 134, such as corrective glasses that are worn. Glasses 100 are arranged so that they may be worn with the individuals other glasses 134 as shown in FIG. 10. The frame 106 of the glasses 100 is sufficiently wide so that the glasses 100 will fit over the individuals other glasses 134. To facilitate placement of the glasses 100 over the individuals other glasses 134, a support piece 122 is removably mounted to the frame 106 of the glasses 100. The support piece 122 extends across the width of the frame 106 as shown. The support piece 122 has a depending triangular shaped projections 124 that fits in either of the formed valleys 126 of the frames 106 to facilitate the reversible mounting. The support piece 122 is thus removably mounted in either of two positions to accommodate the reversibility of the glasses 100.

The support piece 122 is retained by extending clips 130 on the projections 124 that engage recesses 132 in the frame 106 of the glasses 100. It will be appreciated that the support piece 122 may be mounted to the glasses 100 in many different ways to accomplish the same results. The support piece 122 has a projecting lip 128 that extends rearward of the frames 106 when installed on the glasses 100. When the glasses 100 are worn over another pair of glasses 134 the lip 128 of the support piece will rest on the frame 136 of the other pair of glasses 134 to thus properly position the glasses 100 on the individual.

Recall that it is believed that the disparity between images "seen" by the dominant eye and the docile eye contribute greatly in the perception of depth. This coupled with visual experience provides a perception of depth when a three-dimensional object is viewed. Most visual sightings or viewing in real life by the two eyes have an image disparity along a plane extending from the visual axis of the eyes which will be referred to as a visual plane. The eyes are aligned on this visual plane and the disparity between images as seen by the right and left eye are thus oriented along this plane.

It is this recognition of image disparity that provides the perception of depth by the present invention when objects projected on a planar surface or near planar surface are viewed through the glasses of the present invention. The slowing of the light transmission to one of the eyes, and preferably the dominant eye, provides stimulus to the brain of the individual through the disparity of the images seen by the dominant and docile eyes. This image disparity provided by slowing the light transmission to one eye coupled with convergence is further enhanced by providing special lenses in the glasses for each of the dominant and docile eyes.

Further recognizing that the image "seen" by the dominant eye takes precedence or dominates, a lens is provided for the dominant eye that distorts the real image by reducing the image. This reduction of the image is produced by adding a negative power factor, a term known to the industry. Preferably, however, the lens is ground on a single horizontal axis that narrows the image and appears to make the image appear farther away. The docile eye may be provided with a lens that oppositely distorts the image, i.e., by expanding or broadening the image along the visual plane. This is known as adding a positive power factor. Again, the lens is ground on a single horizontal axis.

Referring again to FIGS. 8 and 9, the lens 102 of the glasses 100 for the dominant eye of an individual is ground to narrow the image viewed through the lens 102 along the visual plane. In this embodiment the lens material for lens 102 is blue mold polycarbonate having an index of refraction of about 1.59. The lens is grey tinted to have a transmittance range of about 7% to 7.5%. The lens 102 is a 0.50 prism diopter with the axis of the prism 180 degrees base out and has a horizontal magnifying power in the range (along the visual plane) of about −0.15 to −0.20. The lens 104 (for the docile eye) is ground to broaden the image viewed through lens 104 along the visual plane. The material for lens 104 is an acrylic having an index of refraction of about 1.49. The lens 104 for the docile eye has a clear tint with a transmittance of 100%. The lens 104 is 0.50 prism diopter, 180 degrees base out and has a horizontal magnifying power in the range (along the visual plane) of about +0.15 to +0.20.

Figures 11A, 11B, 11C:
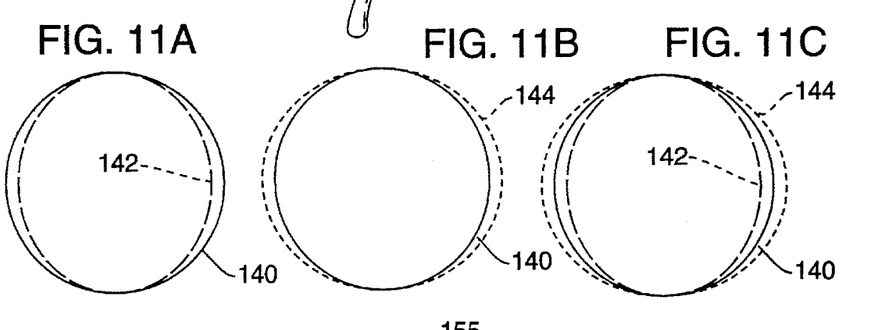
FIGS. 11A, 11B and 11C illustrate the image disparity of images viewed through the lens of the glasses of FIG. 8.

FIG. 11A illustrates the actual (real) image 140 and the apparent image 142 as viewed through lens 102. The actual (real) image 140 is indicated by solid line and the apparent image 142 is indicated by dashed line. As shown the apparent image 142 is narrower than that of the actual (real) image 140. The difference between the real and apparent image has been exaggerated for drawing clarity and for the purpose of an understanding of the principles. FIG. 11B illustrates the actual (real) image 140, again indicated by solid line, and the apparent image 144 as viewed through lens 104 being indicated by dotted line in which the apparent image is broader than that of the real image 140.

FIG. 11C shows the apparent images 142 and 144 super imposed one over the other. As seen there is a disparity between the apparent images 142 and 144. The disparity between the apparent images 142 and 144 is interpreted by the brain of the individual as depth.

Figure 12:
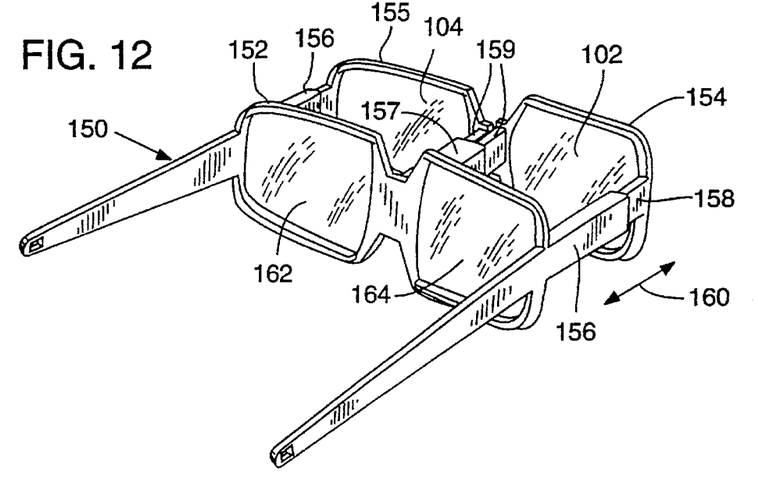
FIG. 12 is a view of another embodiment of the invention which includes a pair of glasses incorporating focusing lenses.

The images may tend to blur when the power of the lens exceeds the 0.20 factor. FIG. 12 illustrates a pair of glasses 150 that incorporate a set of focusing lenses. Focusing is accomplished by spatially adjusting one lens relative to another in a manner similar to that utilized in simple binoculars for example. As seen in FIG. 12, lens 102 is mounted in a movable frame 154 and lens 104 is mounted in a movable frame 155. Focusing lenses 162 and 164 are mounted in frame 152 as shown. Frames 154 and 155 are movably mounted to the frame 152 on telescoping side members 156, 158 and on center telescoping members 157, 159. Side members 158 which are attached to frames 154, 155 slidably fit in side members 156 which are attached to frame 152. Similarly center members 159, one of which is attached to frame 154 and the other to frame 155, are slidably movable in center member 157 which is attached to frame 152 with each member 159 being independently movable in center member 157. Frames 154 and 155 may thus be independently adjusted toward and away from frame 152 as indicated by directional arrow 160.

The images viewed through lenses 162, 104 by one eye and the images viewed through the lenses 164, 102 by the other eye are brought into focus by independently adjusting the frames 155, 154 toward and away from frame 152 as required. Adjusting frame 155 relative to frame 152 will adjust lens 104 relative to the focusing lens 162 and adjusting frame 154 relative to frame 152 will adjust lens 102 relative to lens 164.

It will be appreciated that lenses 162, 164 may also be arranged to be independently movable instead of lenses 102, 104 to accomplish the focusing feature.

Those skilled in the art will recognize that modifications and variations may be made without departing from the true spirit and scope of the invention. The invention is therefore not to be limited to the embodiments described and illustrated herein but is to be determined by the appended claims.

Waht is claimed is:

1. Eyeglasses for a viewer for generating a three-dimensional effect of images projected onto a planar screen comprising:

an eyeglasses frame holding a first and a second eyeglasses lens mounted on the face of a viewer with one of the lenses each mounted in front of one of the viewer's eyes;

said first lens provided with one of the properties including (a) a darkening tint for darkening said first lens as compared to said second lens and (b) a molecularly more dense material for slowing light transmission as compared to said second lens, plus the additional property of a determined negative magnifying power whereby the images on the screen appear delayed to the eye positioned behind said first lens and smaller to said one of the viewer's eyes than actual size and thereby smaller as compared to the other of the viewer's eyes whereby images in motion on the planar screen appear at different positions and in different sizes, which differences produce the appearance of three-dimensional depth.

2. Eyeglasses as defined in claim 1 wherein the negative power is provided on a horizontal axis only to make the images appear more narrow.

3. Eyeglasses as defined in claim 1 wherein said second lens s provided with a positive magnifying power to make the images appear larger to said other of the viewer's eyes than actual size.

4. Eyeglasses as defined in claim 3 wherein the one eye of the viewer is a dominant eye and the other eye of the viewer is a docile eye.

5. Eyeglasses as defined in claim 3 wherein the negative power of the first lens does not exceed more than about −0.20 and the positive power of the second lens does not exceed more than about +0.20.

6. Eyeglasses as defined in claim 1 including a second lens mounted in the eyeglasses frame and positioned over the other of the viewer's eyes, said first lens and said second lens having a common point of convergence.

7. Eyeglasses as defined in claim 6 wherein said common point of convergence is spaced forward of the planar screen.

8. Eyeglasses as defined in claim 7 wherein the second lens is provided with a positive power.

9. Eyeglasses as defined in claim 8 wherein the first lens is positioned over a viewer's dominant eye and the second lens is positioned over a viewer's docile eye.

10. Eyeglasses as defined in claim 8 wherein said first lens is a material that is molecularly more dense than the material of the second lens, the more dense material producing a slowing of the light transmission therethrough to cause the images to be seen by the first eye after the images are seen by the second eye.

11. Eyeglasses as defined in claim 10 wherein the first lens is positioned over the viewer's dominant eye and the second lens is positioned over the viewer's docile eye, said first lens being shaded.

12. Eyeglasses as defined in claim 11 wherein the negative power of the first lens does not exceed more than about −0.20 and the positive power of the second lens does not exceed more than about +0.20.

13. Eyeglasses as defined in claim 11 including an adjustable focusing lens added to the eyeglasses frame for each of said first and second lenses whereby the images can be focused by the viewer for each of the viewer's eyes.

* * * * *